US008724602B2

(12) United States Patent
Tanaka et al.

(10) Patent No.: US 8,724,602 B2
(45) Date of Patent: May 13, 2014

(54) INFORMATION TERMINAL AND COMPUTER PROGRAM

(75) Inventors: Hideki Tanaka, Kawasaki (JP); Isamu Yamada, Kawasaki (JP); Shinichi Shiotsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 12/905,165

(22) Filed: Oct. 15, 2010

(65) Prior Publication Data

US 2011/0090883 A1 Apr. 21, 2011

(30) Foreign Application Priority Data

Oct. 16, 2009 (JP) ................................ 2009-239492

(51) Int. Cl.
*H04W 88/02* (2009.01)
(52) U.S. Cl.
USPC ........................................................ 370/338
(58) Field of Classification Search
USPC ........................................................ 370/338
See application file for complete search history.

(56) References Cited

U.S. PATENT DOCUMENTS

| 7,518,510 | B2 | 4/2009 | Kojo |
| 7,633,375 | B2 | 12/2009 | Matsuda et al. |
| 2007/0040678 | A1* | 2/2007 | Kojo .......................... 340/568.1 |
| 2007/0167182 | A1* | 7/2007 | Tenhunen et al. ............. 455/512 |
| 2008/0004011 | A1* | 1/2008 | Ober .......................... 455/435.1 |
| 2008/0091823 | A1* | 4/2008 | Ito ................................. 709/224 |

FOREIGN PATENT DOCUMENTS

| JP | 2003-70057 A | 3/2003 |
| JP | 2004-189027 A | 7/2004 |
| JP | 2005-242585 A | 9/2005 |
| JP | 2005-295186 A | 10/2005 |
| JP | 2007-233441 A | 9/2007 |

OTHER PUBLICATIONS

Japanese Office Action mailed May 28, 2013 for corresponding Japanese Application No. 2009-239492, with Partial English-language Translation.

* cited by examiner

*Primary Examiner* — Sulaiman Nooristany
(74) *Attorney, Agent, or Firm* — Fujitsu Patent Center (57) ABSTRACT

An information terminal includes: a wireless communication section configured to communicate with an outside; a main functional section configured to perform an information processing operation that includes data communication with the outside, performed using the wireless communication section; a monitoring section configured to detect a state of power supply for the main functional section; and a communication control section configured to cause the wireless communication section to transmit data, preliminarily stored in a memory, to the outside when the state detected by the monitoring section corresponds to a state in which the main functional section is not capable of performing data communication using the wireless communication section.

9 Claims, 11 Drawing Sheets

FIG. 3

| TIME INFORMATION | CONTENT OF USAGE SITUATION | MAC ADDRESS | BSSID |
|---|---|---|---|
| 8:00 | POWER ON | 0a:0b:0c:0d:0e:0f | 01:02:03:04:05:06 |
| 8:10 | NETWORK CONNECTION | 0a:0b:0c:0d:0e:0f | 01:02:03:04:05:06 |
| 8:30 | SUSPEND STATE | 0a:0b:0c:0d:0e:0f | 01:02:03:04:05:06 |
| 8:40 | POWER ON | 1a:1b:1c:1d:1e:1f | 11:12:13:14:15:16 |
| 9:00 | OPERATIONAL STATE | 0a:0b:0c:0d:0e:0f | 01:02:03:04:05:06 |
| ...... | ...... | ...... | ...... |

FIG. 6

| POWER SUPPLY STATUS | CONTROL OF WIRELESS COMMUNICATION | | SELECT SIGNAL (USB-I/F) |
|---|---|---|---|
| | CPU CONTROL | MC CONTROL | |
| OPERATION(S0) | ENABLE | DISABLE | USB-I/F 1 |
| STANDBY(S3) | DISABLE | ENABLE | USB-I/F 2 |
| HIBERNATION(S4) | DISABLE | ENABLE | USB-I/F 2 |
| POWER OFF(S5) | DISABLE | ENABLE | USB-I/F 2 |

INFORMATION TERMINAL AND COMPUTER PROGRAM

CROSS-REFERENCE TO RELATED APPLICATIONS

This application is based upon and claims the benefit of priority of the prior Japanese Patent Application No. 2009-239492, filed on Oct. 16, 2009, the entire contents of which are incorporated herein by reference.

FIELD

Embodiments of the present invention relate to an information terminal that has a wireless communication function and a computer program installed into the information terminal.

BACKGROUND

In recent years, the number of companies and other organizations that possess portable information terminals such as notebook personal computers and personal digital assistants (PDAs) has been increasing. The portable information terminal into which a wireless communication device is embedded or to which an external wireless communication device is attached has a convenience that the portable information terminal can access a network everywhere with no distributing cable in an environment in which a wireless local area network (LAN) is established. On the other hand, the portable information terminal has the risk of information leak owing to the usage thereof in a place other than a predetermined place, and has the higher risk of being stolen than a stationary information terminal. The same is true in cases in which private information terminals are used for business purposes. Accordingly, in companies and other organizations, which manage the information terminals as equipments or assets, it is necessary for high quality management that reduces the above-mentioned risks to frequently confirm the whereabouts of the information terminals.

In Japanese Unexamined Patent Application Publication No. 2007-233441, a method that utilizes a radio frequency identification (RFID) technique is discussed as a method used for determining whether or not an information terminal is located in a predetermined place. The RFID is a technique for identifying an individual using a radio wave. In an RFID system, while a passive or an active RFID tag is attached to the information terminal, a reader/writer, which communicates with the RFID tag of the information terminal, is installed at a doorway of a predetermined area. Accordingly, it is automatically detected that the information terminal is taken out from the predetermined area. When the information terminal passes through the doorway, a warning tone can also be emitted. In addition, practical applications of the RFID include a technique in which access to files in the information terminal is restricted on the basis of pieces of information in both the RFID tag and reader/writer. According to the technique, browsing and editing of files are inhibited in an area other than the predetermined area, and hence the risk of information leak is reduced.

In addition, in Japanese Unexamined Patent Application Publication No. 2005-242585, a method in which the movement of an information terminal within a range that allows wireless LAN communication is detected using a gyro sensor is discussed. In the method, the movement of the information terminal, which is longer than or equal to a constant distance, is detected on the basis of location information detected by the gyro sensor. When the information terminal that has moved is in a state in which main power supply is turned off, the main power supply is automatically turned on, and location information after the movement is transmitted using the wireless LAN.

Furthermore, as a method for confirming the whereabouts of an information terminal in a wide area, there is a method in which a mobile phone communication network that a mobile service provider provides is utilized. A module capable of connecting to the mobile phone communication network is installed within the information terminal. Accordingly, in the same way as a mobile phone, an area that includes the current location of the information terminal is specified on the basis of the location information of a base station that has communicated with the module in the information terminal.

SUMMARY

According to an aspect of the invention, an information terminal includes: a wireless communication section configured to communicate with an outside; a main functional section configured to perform an information processing operation that includes data communication with the outside, performed using the wireless communication section; a monitoring section configured to detect a state of power supply for the main functional section; and a communication control section configured to cause the wireless communication section to transmit data, preliminarily stored in a memory, to the outside when the state detected by the monitoring section corresponds to a state in which the main functional section is not capable of performing data communication using the wireless communication section.

The object and advantages of the invention will be realized and attained by at least the features, elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When the whereabouts of an information terminal is confirmed, it is desirable to determine whether or not the information terminal is located in an intended area such as in a company or the like, even if the information terminal is in a nonoperational state. As a system that allows confirming the whereabouts of the information terminal, a system having a small number of hardware elements at the time of introduction is desirable. In order to introduce a system that uses the RFID, it may be necessary to prepare at least the same number of RFIDs as the information terminals and the same number of reader/writers as doorways. Therefore, the introduction cost of the RFID system and the RFID tags the number of which is the same as the number of terminals to be managed becomes a problem. In a system in which a gyro sensor is used, while a wireless LAN environment is utilized, it may be necessary to embed the gyro sensor into the information terminal.

However, almost no information terminal into which a wireless LAN function and a gyro sensor are embedded has been sold, and hence the range of choices for the information terminals is narrow. Furthermore, to replace all the managed information terminals is a problem with respect to an introduction cost. In a system that uses a mobile phone communication network, it may be necessary to equip an information terminal with a dedicated communication module, which is a problem with respect to an introduction cost. Furthermore, it may be necessary to sign a service contract with a mobile service provider, and a running cost is also a problem in addition to the introduction cost.

The information terminal includes a main processor, a sub processor the power consumption of which is less than the main processor, and a communication section that may be accessed from the main processor and the sub processor. In a state in which the main processor operates, the main processor controls the communication section. In a state in which the main processor does not operate, the sub processor controls the communication section. The sub processor controls the communication section, and transmits information used for specifying the information terminal and information used for indicating the state of the information terminal to a server. As the communication section, a wireless communication section that has a wireless communication function is desirable.

In a main functional section, when the main processor operates, power supply is turned on, and when the main processor does not operate, power supply is turned off. A power monitor section monitors the operation status of the main processor. For example, the power monitor section determines the state of power supply for the main functional section. In another example, the power monitor section refers to a status register, which indicates the operation status of the information terminal, and determines whether the power supply status of the information terminal is S0, or one of S1 to S5 other than S0. The sub processor has the function of a communication control section, by executing a device driver that controls the communication section. A wireless communication device that communicates with the outside is attached to the wireless communication section.

The main functional section performs an information processing operation that includes data communication with the outside using the wireless communication device. The monitoring section detects the state of power supply for the main functional section. When the state detected by the monitoring section corresponds to a state in which the main functional section is not capable of performing data communication using the wireless communication device, the communication control section causes the wireless communication device to transmit data, preliminarily stored in a memory, to the outside.

The information terminal complies with a system in which whether or not an information terminal is located in a wireless communication area is managed using wireless communication even if the information terminal in a nonoperational state. A dedicated wireless functional component such as an RFID tag is not necessary for the information terminal. In addition, an output from a location detection component such as a gyro sensor is not necessary for the information terminal.

Figure 1:
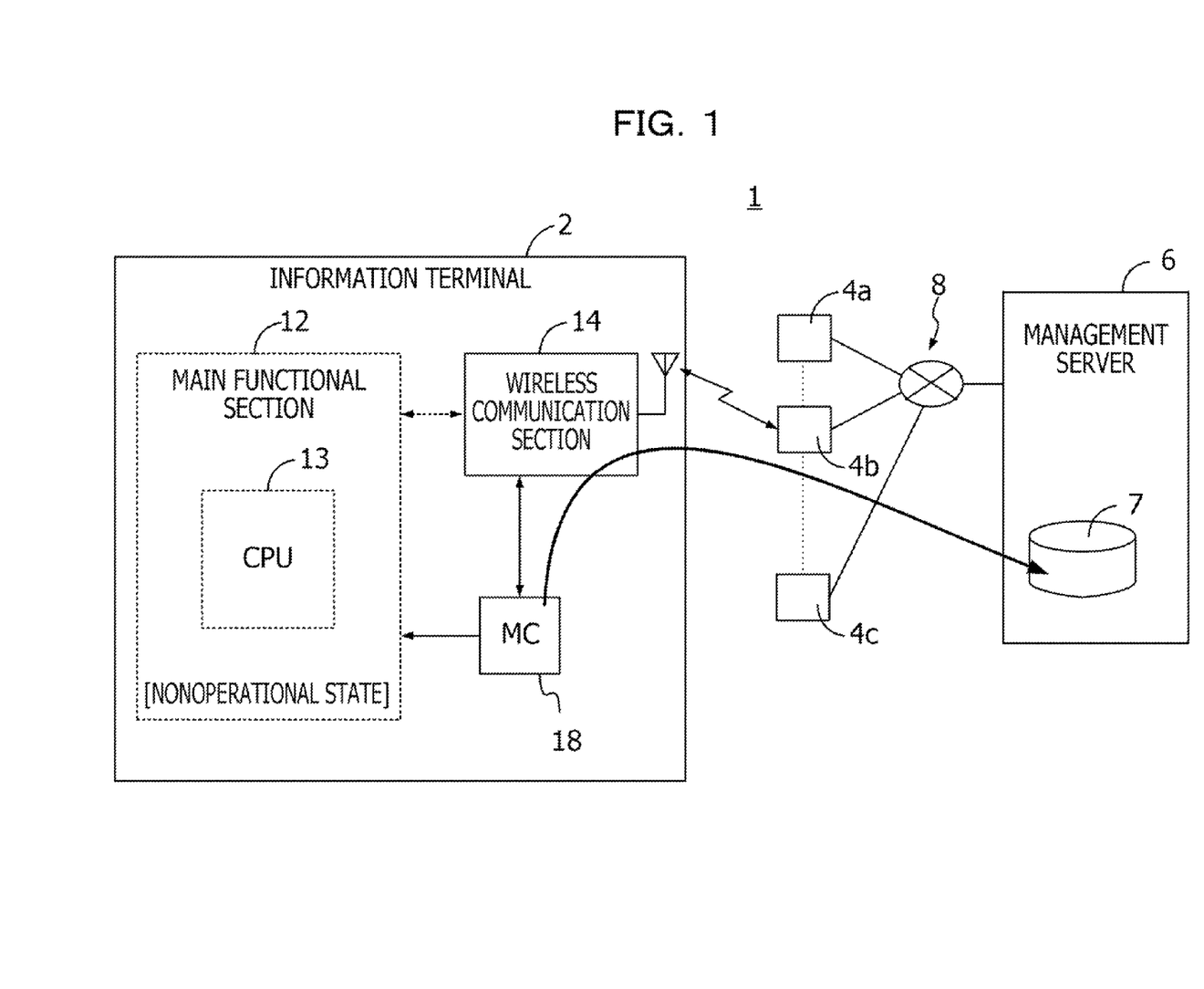
FIG. 1 is a diagram illustrating a terminal management system.

A terminal management system 1 illustrated in FIG. 1 is a system in which the whereabouts of an information terminal 2 at a time and the operation status of the information terminal 2 before the time are recorded in a management server 6. The whereabouts of the information terminal 2 indicate a location at which the information terminal 2 may communicate with one of a plurality of access points 4*a*, 4*b*, and 4*c* in a wireless communication network 8. The operation status includes the on/off state of power supply and a connection with or a disconnection from the wireless communication network 8. The management server 6 is periodically notified of the whereabouts and the operation status of the information terminal 2, which are stored in a database 7 in the management server 6. The terminal management system 1 may be used for confirming the whereabouts of the information terminal 2 and the operation status of the information terminal 2.

The information terminal 2 that is a management object is an information device capable of executing various kinds of information processing operations that include wireless data communication. Examples of an information terminal 2 include but are not limited to personal computers or other computing devices having processor(s) therein. With respect to the necessity for the confirmation of the whereabouts, while a portable information terminal such as a notebook personal computer, which is easy to carry, is suitable, the information terminal 2 does not necessarily have to be portable. In addition to the information terminal 2, one or a plurality of other information terminals may be management objects.

In the information terminal 2, a wireless communication operation in which the management server 6 is notified of the whereabouts and the operation status is controlled by a microcontroller or microcomputer (MC) 18 that is indicated by "MC" in FIG. 1. The microcomputer (in some cases, referred to as "MC" hereinafter) 18 is an auxiliary controller that controls power supply for a main functional section 12 in the information terminal 2. While, compared with a central processing unit (CPU) 13 in the main functional section 12, the processing ability of the MC 18 is low, the power consumption of the MC 18 is much less than that of the main functional section 12. For example, the MC 18 corresponds to a controller included in an information device that has a power saving mode such as a standby (suspend) mode or a hibernation mode.

Examples of a controller that is in an operational status even in the power saving mode include a USB controller, a power management controller, and a keyboard controller. Each of these controllers includes an interface, a processor, a RAM, a flash memory, and a dedicated circuit. The interface is, for example, an interface that complies with a PCI bus standard and receives instructions and data, output from the main processor. The processor is a 4-bit, 8-bit, or 16-bit processor that controls the controller. The flash memory stores firmware used for causing the processor to operate. The RAM is used by the processor so as to execute the firmware. The dedicated circuit is a circuit specific for each controller. The circuit dedicated for the USB controller is a control circuit that controls a USB device. The circuit dedicated for the power management controller is a circuit that controls a voltage supplied to another chip and an on-off operation for power supply. The circuit dedicated for the keyboard controller is a circuit that detects pressing of a key and determines the pressed key.

For example, the MC 18 is a processor embedded in the controller. Even if the main functional section 12 is in a nonoperational state, the MC 18 receives power supply and operates independently from the main functional section 12. For example, when the information terminal 2 is in an operational state, power is supplied to the main functional section 12. In addition, when the information terminal 2 is in the power saving mode such as the standby mode or the hibernation mode, no power is supplied to the main functional section 12, or the main functional section 12 is in a state where the power consumption thereof is less than in an operational state in which power is partially supplied to the main functional section 12.

Figure 10:
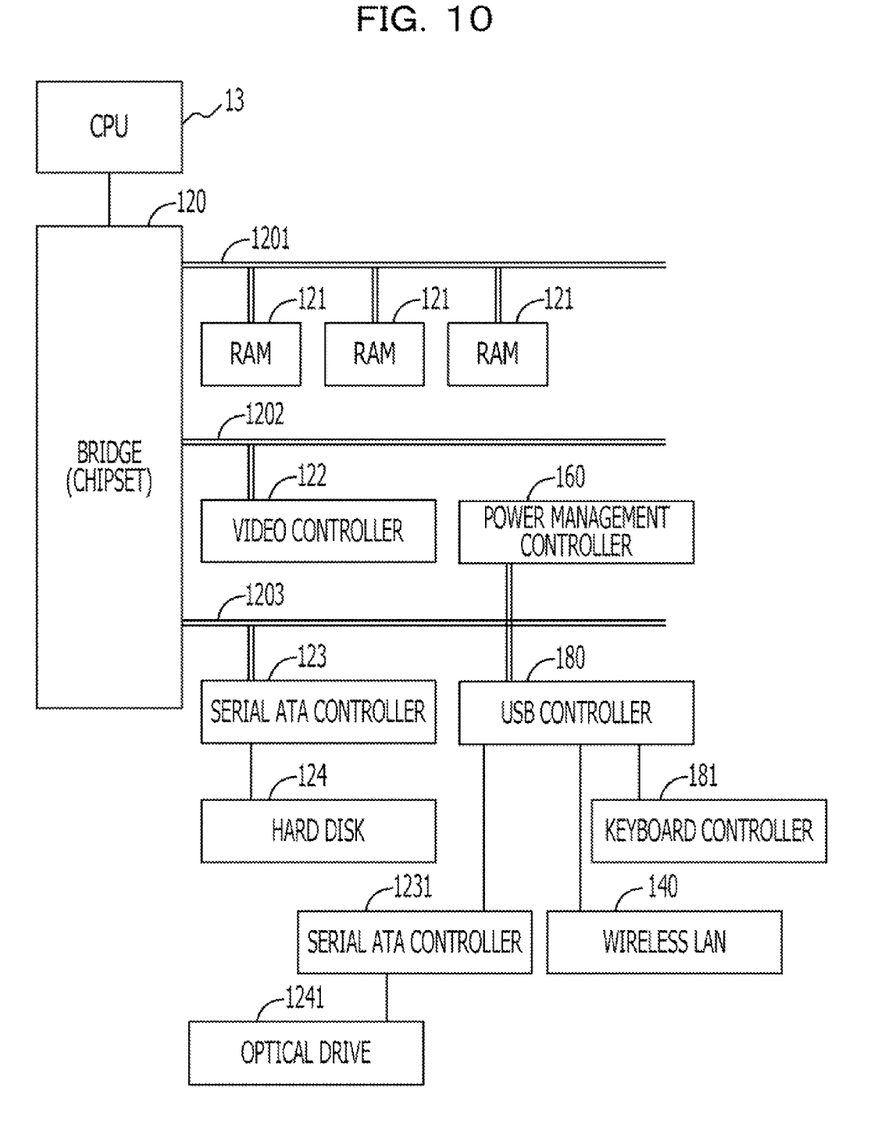
FIG. 10 is a diagram illustrating an information terminal.

FIG. 10 illustrates an example of the information device. The information device includes a main processor 13 called CPU and a bridge circuit 120 connected to the main processor. The bridge circuit 120 is an LSI that is called chipset and includes a first bridge and a second bridge. The bridge circuit 120 functions as a bridge between the main processor 13 and various kinds of buses. The bridge circuit includes, for example, a memory bus 1201, a graphic bus 1202, and a PCI bus 1203. Various kinds of circuits are connected to these buses.

A RAM 121 used by the main processor so as to execute a program is connected to the memory bus 1201. A video controller 122, which generates an image output to a display device, is connected to the graphic bus 1202. The video controller 122 is not necessarily connected to the graphic bus 1202, but the video controller 122 may be embedded in the bridge circuit 120. A circuit, which includes a peripheral function employed by the information device, is connected to the PCI bus 1203.

For example, a serial ATA controller 123 for using a hard disk 124 is connected to the PCI bus 1203. For example, a USB controller 180 is connected to the PCI bus 1203. In addition, for example, a power management controller 160, which controls electric power supplied to a plurality of LSIs within the information device and manages the electric power consumed in the information device, is connected to the PCI bus 1203. For example, a serial ATA controller 1231 for using an optical drive 1241, a wireless LAN 140, which communicates with an access point, and a keyboard controller 181 for using a keyboard are connected to the USB controller 180.

Figure 11:
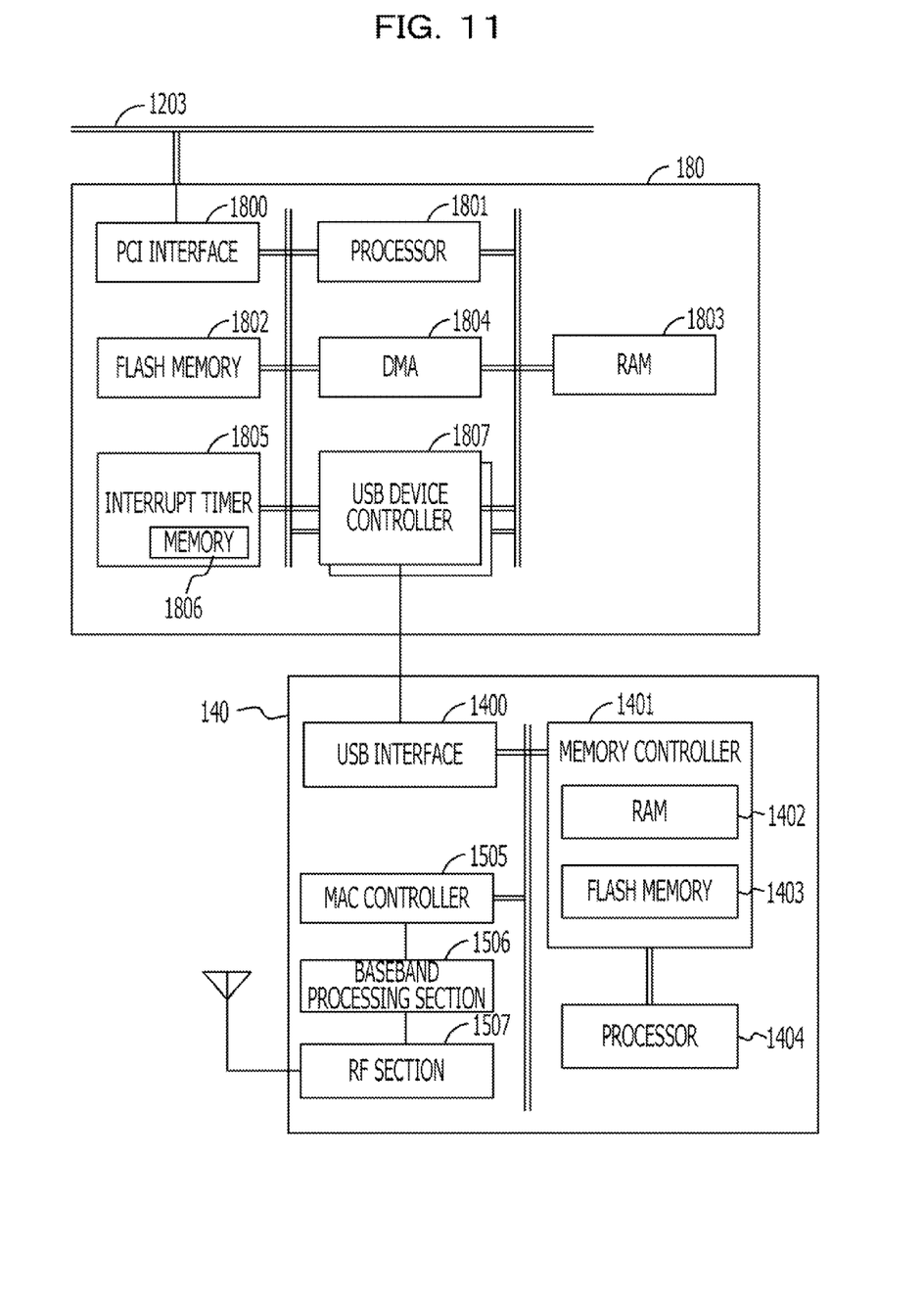
FIG. 11 is a diagram illustrating a microprocessor.

FIG. 11 illustrates examples of the USB controller 180 and the wireless LAN 140. The USB controller 180 includes a PCI interface 1800, a processor 1801, a flash memory 1802, a RAM 1803, a DMA 1804, an interrupt timer 1805 that includes a memory 1806 used for storing a timer value to be counted, and a USB device controller 1807. The PCI interface 1800 is connected to the PCI bus 1203 in the information device, and functions a bride between the main processor 13 and the USB controller 180. The processor 1801 reads out firmware recorded in the flash memory 1802, and executes the firmware with using the RAM 1803.

The interrupt timer 1805 counts a time set in the embedded memory 1806, and generate an interrupt signal for the processor 1801 when a time stored in the embedded memory 1806 has elapsed. The USB device controller 1807 converts a signal that complies with a USB standard, and functions as a bridge between an internal bus and a USB device. When a connected USB device complies with a high speed operation, the USB device controller 1807 transfers a large amount of data by reading and writing data from and into a data area in the RAM 1803. The DMA 1804 functions as a bridge between the PCI interface 1800 and the RAM 1803.

In addition, the USB controller 180 is illustrated as a single function in FIG. 11, as a matter of convenience for description. However, in many cases, the USB controller 180 is embedded in a circuit such as the bridge circuit 120, the keyboard controller 181, or the like, which has another function.

The wireless LAN 140 includes a USB interface 1400, a memory controller 1401, a processor 1404, a MAC controller 1505, a baseband processing section 1506, and an RF section 1507. The USB interface 1400 functions as a bridge between the USB controller 180 and the wireless LAN 140. The memory controller 1401 controls a RAM 1402 and a flash memory 1403, and is connected to the internal bus and the processor 1404. The processor 1404 reads out firmware recorded in the flash memory 1403, and executes the firmware with using the RAM 1402.

The MAC controller 1505 converts data so that the data complies with a communication standard, and functions as a bridge between the network and the internal bus. The baseband processing section 1506 converts a signal, which has been converted, in the MAC controller 1505, to comply with the communication standard, to a wireless signal, and sends out the converted signal to the RF section 1507. The baseband processing section 1506 decodes a wireless signal, received at the RF section 1507, and sends out the decoded signal to the MAC controller 1505. The RF section 1507 amplifies, using a power amplifier, the signal sent out from the baseband processing section 1506, and sends out the amplified signal to an antenna. The RF section 1507 amplifies, using a low noise amplifier, a wireless signal that the antenna receives, and sends out the amplified wireless signal to the baseband processing section 1506.

As described with reference to FIG. 11, many LSIs include processors therein, and are controlled using firmware. The MC 18 utilizes a processor embedded in such a LSI. With respect to in which LSI a processor to be utilized as the MC 18 is embedded, a LSI to which power is supplied even if the power supply status of the information terminal is any one of S0 to S5 is desirable. Furthermore, when a LSI through which a wireless LAN signal passes is selected, a switcher used for switching between a processor that functions as the MC 18 and the main processor 13 is realized using software, and the modification of hardware does not occur. Therefore, the introduction cost is desirably reduced to a low level. For example, when the processor 1404 or the processor 1801, illustrated in FIG. 11, is used, the modification of hardware is not necessary for the switcher. In addition, when an interface for a wireless LAN is a USB interface, the switcher can also be realized with existing hardware, by arbitrarily controlling a USB controller. In such a case, for example, even if a processor embedded in the power management controller 160 is used, the modification of hardware is not necessary. The detail of the function of the MC 18 is as described later.

Figure 2:
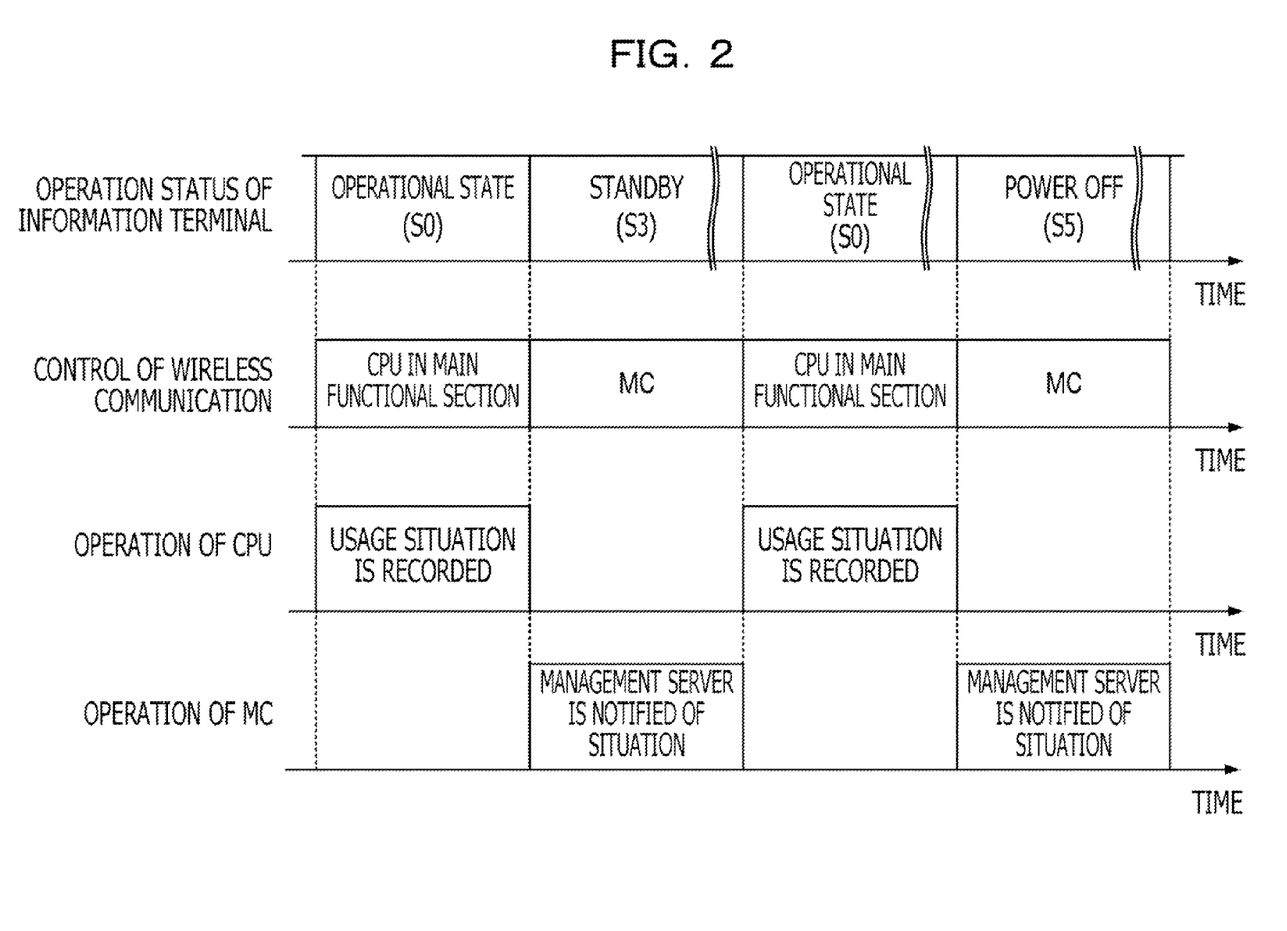
FIG. 2 is a time chart illustrating an operation status of an information terminal.

When the main functional section 12 is in a nonoperational state, the MC 18 controls the wireless communication section 14 to transmit data, recorded in a log memory, to the management server 6. As illustrated in FIG. 2, when the main functional section 12 is in an operational state, the CPU 13 in the main functional section 12 has control of the wireless communication section 14. At this time, every time a preliminarily defined event occurs, the CPU 13 records the content of the event as the usage situation of a user. For example, the operational state corresponds to the status 0 (S0) of an advanced configuration and power interface (ACPI) that is a standard that relates to power control.

When the state of the main functional section 12 transitions from the operational state to the nonoperational state such as the standby mode, a power off mode, or a hibernation mode, the control of the wireless communication section 14 shifts to the MC 18. The MC 18 that has the control notifies the management server 6 of a status recorded by the CPU 13. The nonoperational state corresponds to the statuses 3, 4, and 5 (S3, S4, and S5) of the ACPI. During a period when the nonoperational state continues, the notification from the MC 18 is repeated every time a time set in a timer, for example, a time such as 10 minutes, has elapsed or every time a set time has come. When the state of the main functional section 12 transitions from the nonoperational state to the operational state, the control returns from the MC 18 to the CPU 13.

Figure 3:
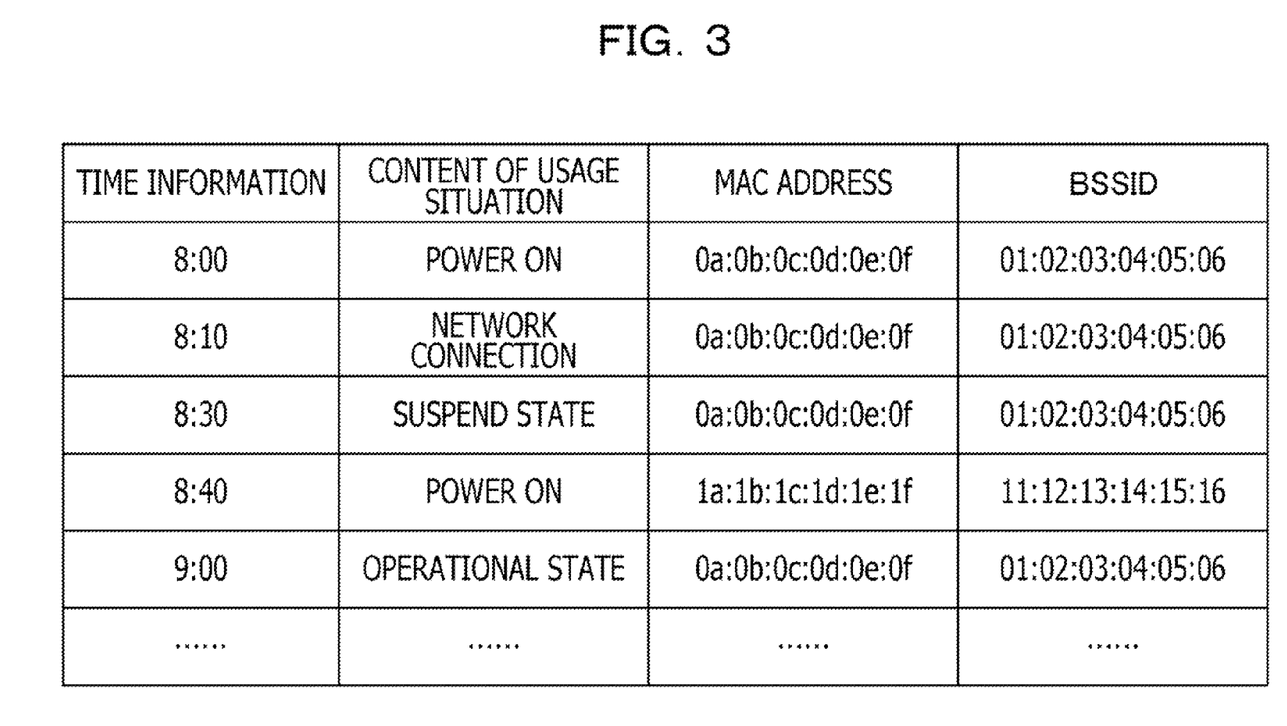
FIG. 3 is a diagram illustrating data transmitted from the information terminal to a management server.

As illustrated in FIG. 3, data transmitted to the management server 6 includes the time information of recording by the CPU 13, the content of a usage situation, and a media access control address (MAC address) of the wireless communication section 14 as information used for specifying the information terminal 2. In addition, along with these pieces of information, a basic service set identifier (BSSID) as information used for specifying the whereabouts of the information terminal 2 is transmitted. The BSSID is the MAC address of one access point that is included in a plurality of access point 4a, 4b, and 4c and with which the information terminal 2 establishes connection at the time of data transmission. Even if the information terminal 2 is in a power OFF state, the whereabouts of the information terminal 2 is recorded at the management server 6 owing to the transmission of the BSSID.

Figure 4:
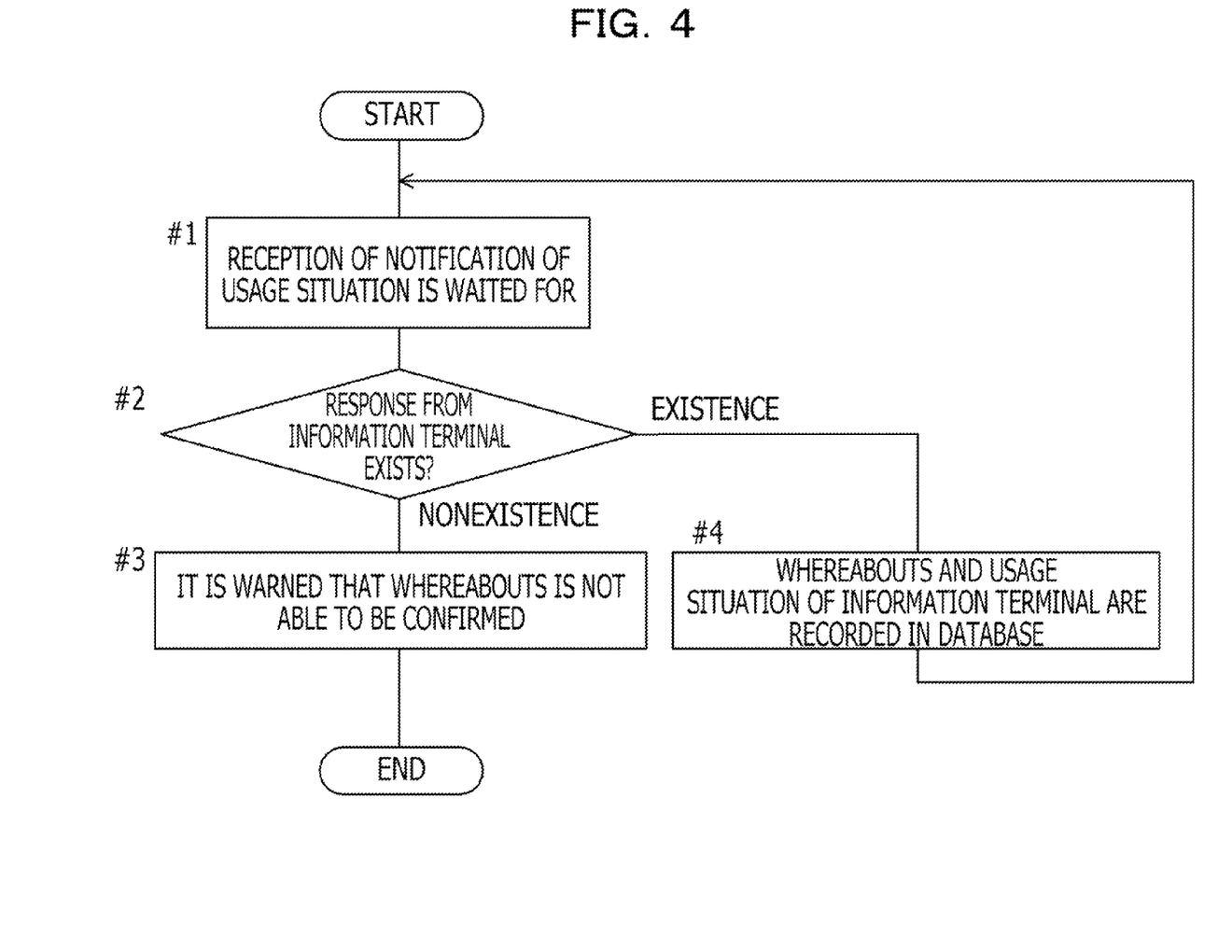
FIG. 4 is a flowchart illustrating a processing operation performed in the management server.

Owing to an terminal management operation performed in the management server 6, illustrated in FIG. 4, information given notice of by the information terminal 2 is registered in the database 7 (#1, #2, and #4). At a time when the MC 18 is to give notice, which is determined on the basis of the time interval of notification or the time setting of notification, if no notification from the information terminal 2 is received, the management server 6 warns an administrator that the whereabouts of the information terminal 2 is not able to be confirmed (#1, #2, and #3). For example, there is a warning method in which the information terminal 2 is emphasized or a message is displayed, on a monitor screen for displaying a list of the content of the database 7.

The configuration and the operation of the information terminal 2 will be described in more detail hereinafter.

Figure 5:
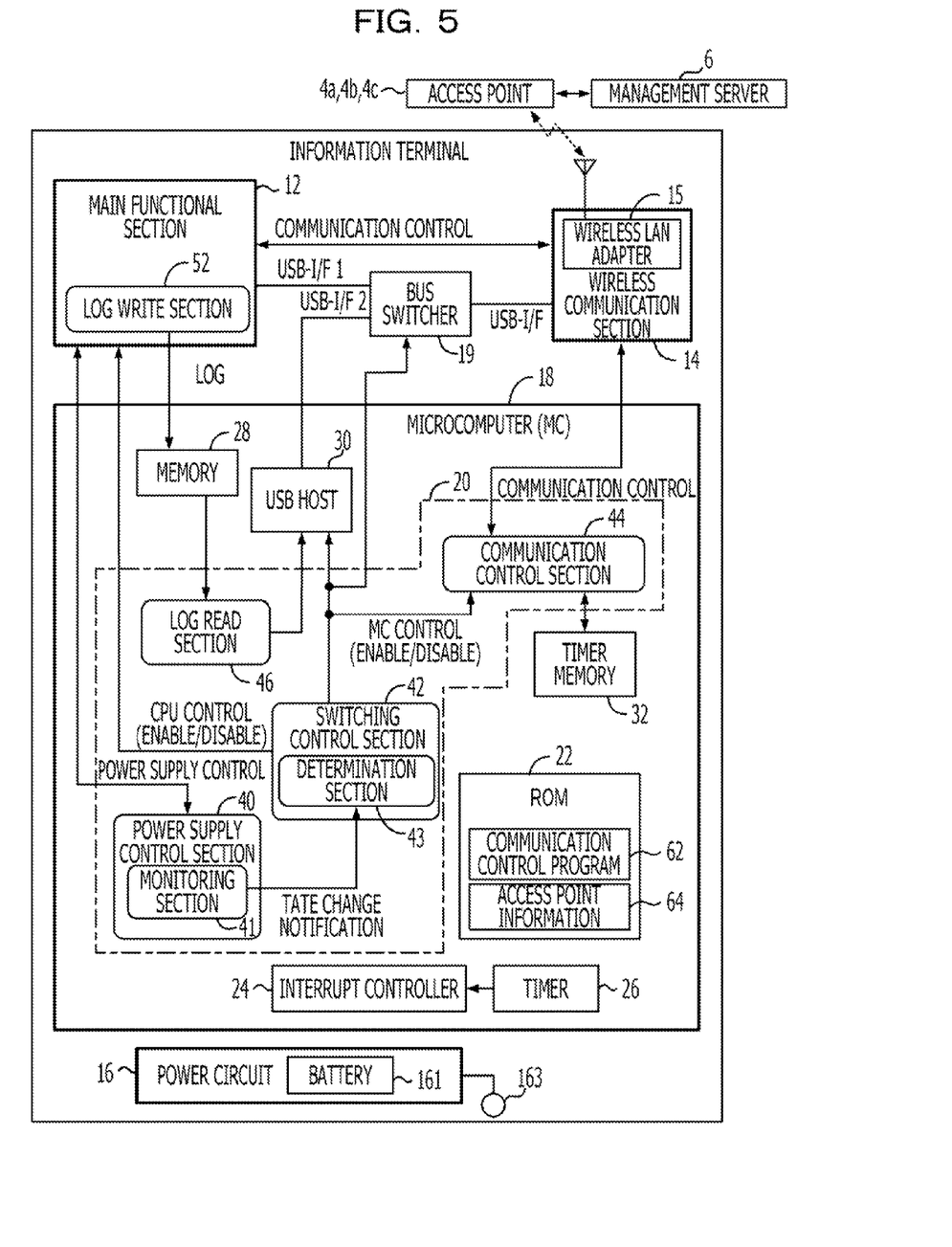
FIG. 5 is a diagram illustrating a function of the information terminal.

As illustrated in FIG. 5, the information terminal 2 includes the main functional section 12, the wireless communication section 14, a power circuit 16, and the microcomputer (MC) 18. The information terminal 2 operates using electric power supplied from a battery 161 attached to the power circuit 16 or an AC adapter, not illustrated. The AC adapter is connected to an AC adapter connecting terminal 163.

In addition to the CPU 13 mentioned above (refer to FIG. 1), the main functional section 12 includes pieces of hardware such as a main storage device, an auxiliary storage device, a manipulation input device, and a display device (which are not illustrated in FIG. 5). In addition, the main functional section 12 includes a log write section 52, which is a functional component realized by the execution of a program by the CPU 13 using the main storage device. The log write section 52 acquires information of which the management server 6 is to be notified, and delivers the information to the MC 18.

The wireless communication section 14 is a circuit to which the wireless LAN adapter 15 as a wireless communication device used for transmitting and receiving a wireless data signal is attached. With respect to the structure of the wireless communication section 14, a form in which the wireless LAN adapter 15 is embedded in the information terminal 2, as illustrated in FIG. 5, may be adopted, or a form in which the wireless LAN adapter 15 is detachable may be adopted. The wireless communication section 14 receives and transmits data from and to the main functional section 12 and the MC 18 through a bus switcher 19. In the embodiment, a universal serial bus interface (USB-I/F) is used for receiving and transmitting data.

The power circuit 16 changes the supply destination of electric power in accordance with the instruction of a basic input output system (BIOS) or an operating system (OS), executed by the main functional section 12. For example, in the operational state (S0) mentioned above, electric power is supplied to the entire main functional section 12. In the standby mode included in the nonoperational state, electric power is supplied to the main storage device in the main functional section 12, and no electric power is supplied to the auxiliary storage device in the main functional section 12. In the hibernation state and the power OFF state, included in the nonoperational state, no electric power is supplied to the main functional section 12.

The microcomputer (MC) 18 includes an arithmetic block 20, a rewritable read only memory (ROM) 22, an interrupt controller 24, a timer 26, a memory 28, a USB host 30, and a timer memory 32. The MC 18 may perform an intermittent operation used for a power saving function in which the interrupt controller 24 and the timer 26 are involved. The time interval of the intermittent operation, timed by the timer 26, is stored in the timer memory 32, and the setting of the time interval may be changed by the management server 6 or another external device.

The arithmetic block 20 includes a CPU and a random access memory (RAM) as a main storage device, not illustrated in FIG. 5, and executes firmware stored in the ROM 22. The arithmetic block 20 executes a communication control program 62 included in the firmware, and thereby a plurality of functional components are realized. The plurality of functional components include a power supply control section 40, a switching control section 42, a communication control section 44, and a log read section 46, illustrated in FIG. 5. The management server 6 is notified by performing the following operations of these functional components.

Figure 6:
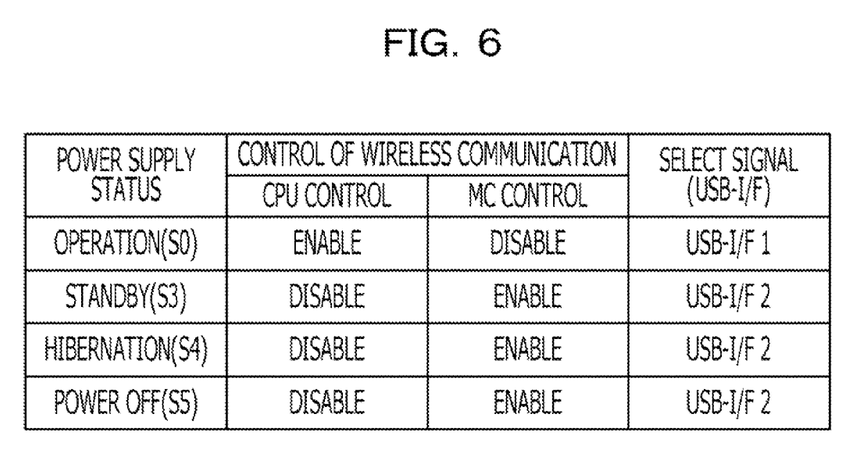
FIG. 6 is a diagram illustrating a switching determination table.

A monitoring section 41 included in the power supply control section 40 monitors the change of the power supply status, which is due to the OS or BIOS in the main functional section 12. When the power supply status is changed, the monitoring section 41 notifies the switching control section 42 of the change of the power supply status. A determination section 43 in the switching control section 42 receives the notification from the monitoring section 41, and determines whether or not the control of wireless communication is to be switched. When the switching of the control is desired, the switching control section 42 changes the contents of "CPU control" and "MC control" that are pieces of data that indicate the whereabouts of the control. FIG. 6 illustrates a relationship between the power supply status and the contents of the CPU control and the MC control.

As illustrated in FIG. 6, when the power supply status is changed from the operational state to the nonoperational state, the switching control section 42 changes the "CPU control", which indicates that the CPU 13 in the main functional section 12 has the control, form "Enable" to "Disable". In parallel with this operation, the switching control section 42 changes the "MC control", which indicates that the MC 18 has the control, form "Disable" to "Enable". In addition, in contrast, when the power supply status is changed from the nonoperational state to the operational state, the switching control section 42 changes the "CPU control" form "Disable" to "Enable", and changes the "MC control" form "Enable" to "Disable".

When the "MC control" is changed form "Disable" to "Enable", the communication control section 44 controls the wireless communication section 14 to establish connection with the management server 6 using access point information 64 stored in the ROM 22. In addition, the bus switcher 19, which receives the "MC control" as a select signal, activates a USB-I/F2 that connects the bus switcher 19 with the USB host 30. Accordingly, data communication between the MC 18 and the management server 6 becomes available. At this time, a USB-I/F1 that connects the main functional section 12 with the bus switcher 19 is deactivated.

After the connection between the management server 6 and the MC 18 has been established, logs stored in the memory 28 are loaded into the arithmetic block 20 by the log read section 46. The logs are pieces of information, delivered from the log write section 52 in the main functional section 12 before the main functional section 12 is put into the nonoperational state, as described above. The logs loaded into the arithmetic block 20 are sent to the wireless communication section 14 through the USB host 30 and the bus switcher 19, and are transmitted to the management server 6 by the wireless LAN adapter 15. At this time, as described above, the identification information (BSSID) of the access point is added as the whereabouts information of the information terminal 2 to the logs.

Figure 7:
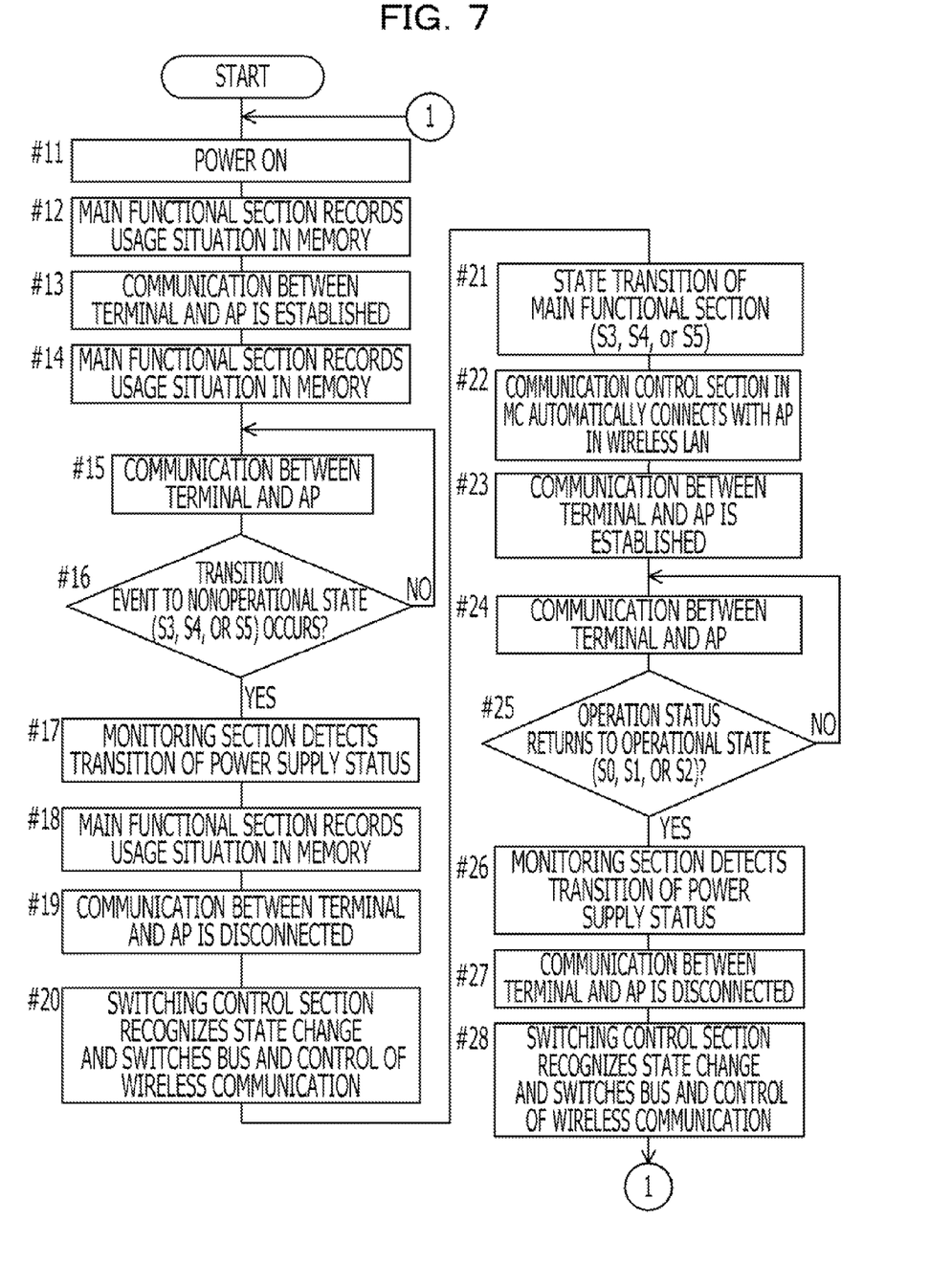
FIG. 7 is a flowchart illustrating a processing operation performed in the information terminal.

A flowchart in FIG. 7 illustrates the general outline of the operation of the information terminal 2, described above.

In FIG. 7, when power is applied, the main functional section 12 causes the MC 18 to record a usage situation (#11 and #12). The application of power is regarded as a situation in which a user intends to start using the information terminal 2. In addition, when a connection between the information terminal 2 and one of access points (AP) 4a, 4b, and 4c in the wireless network 8 is established, the main functional section 12 causes the MC 18 to record a usage situation (#13 and #14). The establishment of connection is regarded as a situation in which the user has logged into the wireless network 8. After that, in a situation in which the operational state continues, communication between the main functional section 12 and the access point is performed in response to the operation of the user (#15). The communication includes the reception and transmission of e-mail messages and the viewing of websites on the Internet connected to the wireless network 8.

When a transition event from the operational state to the nonoperational state occurs (#16: YES), the monitoring section 41 in the MC 18 detects the transition of the power supply status (#17). At this time, the main functional section 12 causes the MC 18 to record a usage situation (#18). A situation in which the user has powered off, or a situation in which the information terminal 2 has been put into the standby mode because, during a substantially constant period, the information terminal 2 had not been operated is recorded. In addition, the connection between the main functional section 12 and the access point is cancelled by the main memory section 12, and the communication link with the management server 6 is disconnected (#19).

The switching control section 42 in the MC 18 recognizes that the power supply status is to be changed, and switches a bus used for communication and the control of wireless communication (#20). Under the control of the power supply control section 40 in the MC 18, the state of the main functional section 12 transitions from the operational state to the nonoperational state (#21). In the nonoperational state, the communication control section 44 in the MC 18 automatically connects with an access point in the wireless network 8 (#22), and establishes connection with the access point (#23). In a situation in which the nonoperational state continues, communication with the access point is periodically performed so as to periodically notify the management server 6 (#24) as further described with reference to FIGS. 8 and 9 below.

When a transition event, which causes the main functional section 12 to return from the nonoperational state to the operational state, occurs (#25: YES), the monitoring section 41 in the MC 18 detects the transition of the power supply status (#26), and the communication control section 44 cancels the connection with the access point (#27). In addition, the switching control section 42 in the MC 18 recognizes that the power supply status is to be changed, and switches a bus and the control of wireless communication (#28). After that, processing operations from #11 to #28, illustrated in FIG. 7, are repeated.

Figure 8:
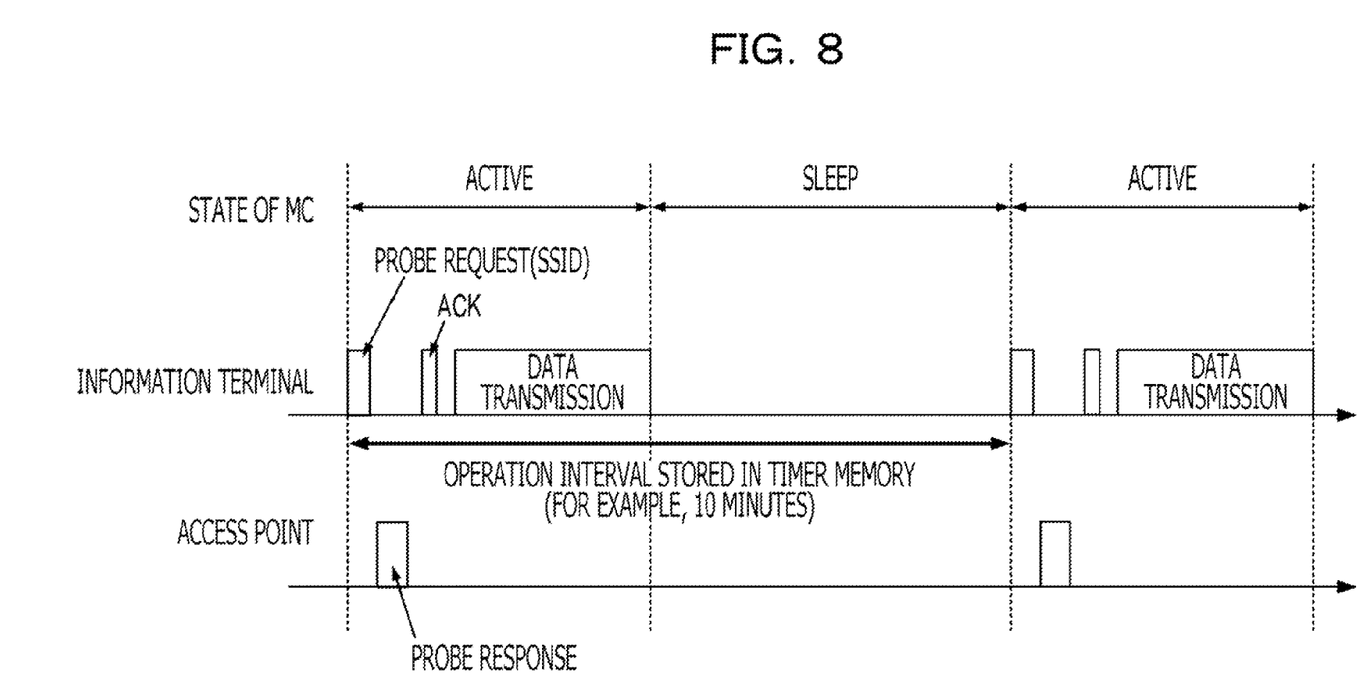
FIG. 8 is a time chart illustrating an intermittent operation performed in a microcomputer.
Figure 9:
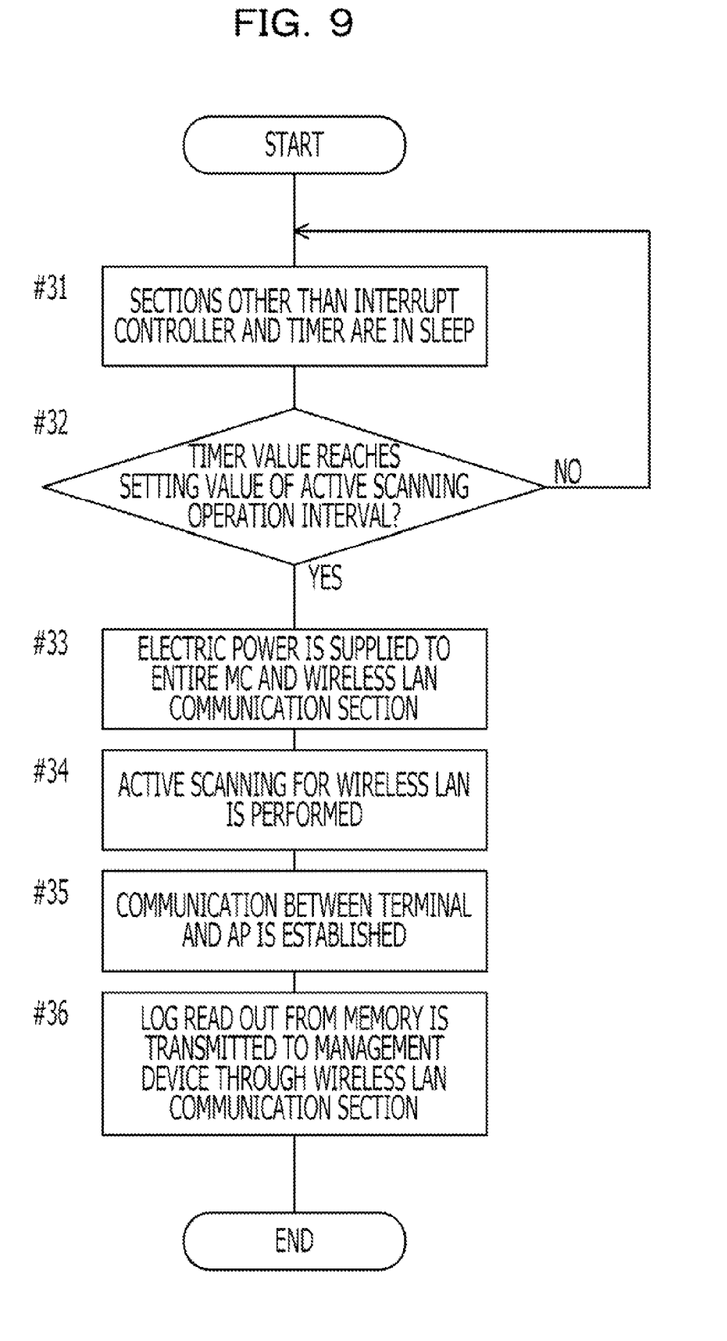
FIG. 9 is a flowchart illustrating a processing operation performed in the microcomputer.

In the information terminal 2, in order to reduce power consumption in the nonoperational state, the MC 18 and the wireless communication section 14 perform intermittent operations, illustrated in FIGS. 8 and 9.

As illustrated in FIG. 8, the state of the MC 18 alternately switches between an active mode and a sleep mode. The active mode corresponds to a state in which electric power used for operation is supplied to the entire MC 18. The sleep mode corresponds to a state in which the supply of electric power to sections in the MC 18 other than the interrupt controller 24 and the timer 26 is halted.

With reference to FIGS. 8 and 9, in the active mode, the communication control section 44 in the MC 18 sends a probe request packet to the wireless network 8, and waits for the reception of a probe response packet from one of the access points 4a, 4b, and 4c (#34 in FIG. 9). When receiving the probe response packet, the communication control section 44 sends to an access point under communication (for example, the access point 4a) a notification (acknowledgement: ACK) that the BSSID has been received (#35 in FIG. 9). After that, the communication control section 44 transmits to the management server 6 a log that indicates the usage situation of the information terminal 2 and the BSSID that indicates the whereabouts of the information terminal 2 (#36 in FIG. 9). When the transmission has been completed, the MC 18 transitions to the sleep mode. Following this, the connection with the access point 4a is cancelled.

The sleep mode is cancelled by the interrupt controller 24. When a time that has elapsed from the starting point of a period when the MC 18 has been in the active mode reaches an operation interval (for example, 10 minutes) stored in the timer memory 32, the interrupt controller 24 switches the state from the sleep mode to the active mode. For example, electric power is supplied to the entire MC 18 and the wireless communication section 14 that includes the wireless LAN adapter 15 (refer to #31 to #33 in FIG. 9). The elapsed time for the operation interval is timed by the timer 26, which then provides an interrupt to the interrupt controller 24 for switching.

The administrator of the terminal management system 1 may arbitrarily change a time timed by the timer 26, namely, an intermittent operation interval. In addition, the setting of the intermittent operation interval may differ from a case, in which electric power is supplied from the battery 161, to another case, in which electric power is supplied from an external power source (typically a commercial alternating current line) through the AC adapter connecting terminal 163. When the battery 161 is used, the consumption of the electric power of the battery 161 is reduced by lengthening the operation interval, compared with a case in which the external power source is used. In such a case, the MC 18 acquires detection information, which indicates whether or not electric power is supplied from the AC adapter, from the power circuit 16. In addition, the MC 18 reads a timer value, which has been preliminarily set in accordance with whether or not electric power is supplied from the AC adapter, from the timer memory 32 and sets the timer value to the timer 26.

According to the embodiment described above, if an information terminal includes an auxiliary programmable controller that controls the wireless LAN adapter 15 independently from the main functional section 12 in substantially the same way as the MC 18, a system used for confirming the whereabouts of the information terminal is realized by installing firmware.

In addition, a program executed in the MC 18 may be recorded in a recording medium that an optical drive installed in the information terminal reads. Examples of the recording medium that the optical drive may read include a CD-ROM, a CD-R, a DVD-ROM, a DVD-R, a BD-ROM, and a BD-R. In addition, examples of the recording medium are not limited to these media but examples of the recording medium include computer-readable recording media such as a USB memory and a hard disk or the like. A program recorded in the recording medium is read out by the CPU 13 in the main functional section 12, and is written from the CPU 13 into a flash memory in which firmware to be executed by the MC 18 is recorded.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. An information terminal comprising:
   a first processor that executes an information processing operation that includes data communication with an external device using a wireless communication device;
   a second processor that executes, as an auxiliary controller, the information processing operation that includes data communication with the external device using the wireless communication device; and
   a third processor that executes a procedure including
      a monitoring process that detects a state of power supply for the first processor; and
      a switching control process performs a switching control operation in response to the state detected in the monitoring process, the switching control process switches control of the wireless communication device to one of the first processor and the second processor, wherein
   the second processor further executes a communication control process that causes the wireless communication device to transmit data, stored in a first memory device, to the external device when the state detected in the monitoring process corresponds to a state in which the first processor is not capable of executing the data communication using the wireless communication device, wherein the data transmitted includes information on whereabouts of the information terminal.

2. The information terminal according to claim 1, wherein when the first processor is in a state in which the first processor is capable of executing the information processing operation, the first processor stores data that indicates an operation status of the information terminal in the first memory device.

3. The information terminal according to claim 1, wherein the first memory device and the second processor are included in a microcomputer.

4. The information terminal according to claim 1, wherein the communication control process establishes a communication connection to the external device on the basis of access point information stored in a second memory device.

5. The information terminal according to claim 1, wherein the procedure further includes:
   an intermittent operation control process that
      alternately switches a state of the wireless communication device between an operational state and a nonoperational state,
      sets an operation interval to a timer,
      changes the state of the wireless communication device to the operational state in response to an interrupt from the timer, and
      changes the state of the wireless communication device to the nonoperational state in response to termination of data transmission performed by the communication control process.

6. The information terminal according to claim 1, wherein the procedure further includes:
   an intermittent operation control process that alternately switches a state of the wireless communication device between an operational state and a nonoperational state.

7. A recording medium that records a program for causing a microcontroller, which is included in an information terminal and is different from a processor also included in the information terminal, to execute a processing operation, the processing operation comprising:
   detecting a state of power supply for the processor which is configured to perform an information processing operation that includes data communication with an external device using a wireless communication device;
   switching, in response to the detected state, control of the wireless communication device to one of the processor and the microcontroller; and
   when the state of power supply corresponds to a state in which the processor is not capable of executing the data communication using the wireless communication device, causing the wireless communication device to transmit data stored in a memory in which the processor stores an operation status of the information terminal when the state of the power supply corresponds to a state in which the processor is capable of executing the data communication using the wireless communication device, wherein the data transmitted includes information on whereabouts of the information terminal.

8. The recording medium according to claim 7, wherein the processing operation further comprises:
   alternately switching a state of the wireless communication device between an operational state and a nonoperational state;
   setting an operation interval to a timer in the microcontroller; and
   changing the state of the wireless communication device to the operational state in response to an interrupt from the timer.

9. A method of controlling an information terminal, the method comprising:
- detecting a state of power supply for a processor that executes an information processing operation that includes data communication with an external device using a wireless communication device;
- switching, in response to the detected state, control of the wireless communication device to one of the processor and a microcontroller; and
- causing, when the state detected in the detecting corresponds to a state in which the processor is not capable of executing the data communication using the wireless communication device, the wireless communication device to transmit, to the external device, data stored in a memory in which the processor stores an operation status of the information terminal when the state of the power supply corresponds to a state in which the processor is capable of executing the data communication using the wireless communication device, wherein the data transmitted includes information on whereabouts of the information terminal.

* * * * *